(12) United States Patent
Bowers et al.

(10) Patent No.: US 6,439,151 B1
(45) Date of Patent: Aug. 27, 2002

(54) LIGHT BOX FOR SHIFTER ASSEMBLY

(75) Inventors: Lee N. Bowers, Fairborn, OH (US); Shigeaki Oda, Shizuoka-Ken (JP)

(73) Assignees: Honda Giken Kogyo Kabushiki Kaisha (JP); Kabushiki Kaisha Atsumi Tec (JP)

(*) Notice: Subject to any disclaimer, the term of this patent is extended or adjusted under 35 U.S.C. 154(b) by 0 days.

(21) Appl. No.: 09/577,538

(22) Filed: May 24, 2000

(51) Int. Cl.[7] ............................. G01D 11/28; B60Q 9/00
(52) U.S. Cl. ........................ 116/28.1; 116/DIG. 20; 362/29
(58) Field of Search ................. 116/28.1, DIG. 20; 192/218; 74/473.1; 362/491, 23, 29, 30

(56) References Cited

U.S. PATENT DOCUMENTS

| | | | |
|---|---|---|---|
| 2,672,117 A | * 3/1954 | Morphew | ............ 116/DIG. 20 |
| 3,242,900 A | * 3/1966 | Howard | ...................... 116/28.1 |
| 3,772,509 A | * 11/1973 | Hirota | ........................... 362/30 |
| 3,929,092 A | * 12/1975 | Ogura | ................. 116/DIG. 20 |
| 4,565,151 A | 1/1986 | Buma | |
| 5,245,313 A | 9/1993 | Polityka | |
| 5,289,794 A | 3/1994 | Jerro et al. | |
| 5,398,018 A | 3/1995 | Polityka | |
| 5,420,565 A | 5/1995 | Holbrook | |
| 5,537,302 A | * 7/1996 | Hillstrom et al. | ........... 362/246 |
| 5,540,180 A | 7/1996 | Kataumi et al. | |
| 5,626,093 A | 5/1997 | Jacobs et al. | |
| 5,861,800 A | 1/1999 | Peters et al. | |

FOREIGN PATENT DOCUMENTS

| | | | |
|---|---|---|---|
| JP | 6-137425 | * 5/1994 | ................. 116/28.1 |

\* cited by examiner

*Primary Examiner*—Diego Gutierrez
*Assistant Examiner*—R Alexander Smith
(74) *Attorney, Agent, or Firm*—Lahive & Cockfield, LLP

(57) ABSTRACT

A shifter assembly for use in a motor vehicle includes a shifter operatively connected to a transmission of the motor vehicle to shift the transmission between a plurality of operating positions. The shifter assembly also includes a shift position indicator located adjacent to the shifter to indicate one of the operating positions, a light box located beneath the shift position indicator having a parabolic base and side walls, and a light bulb inset in the light box for illuminating the shift position indicator. The light bulb casts a first shadow around a circumference of a base of the light bulb and a second shadow from a tip of the light bulb. The light bulb emits light radially from a body of the light bulb. The light bulb is inset in the light box at an angle a from the base between 0 degrees and 45 degrees. The light bulb is oriented to emit light on the shift position indicator.

4 Claims, 4 Drawing Sheets

LIGHT BOX FOR SHIFTER ASSEMBLY

BACKGROUND OF THE INVENTION

This invention pertains to the art of methods and apparatuses for indicating the shift position of a transmission of a motor vehicle, and more specifically to methods and apparatuses for illuminating a shift position indicator next to a motor vehicle shifter for shifting the transmission of the motor vehicle.

DESCRIPTION OF RELATED ART

A conventional on-the-floor shifter for an automatic transmission includes a shifter that moves the transmission between Park (P), Reverse (R), Neutral (N), Drive (D), and various other driver gears (i.e., 3, 2, and 1). A shift position indicator with notations such as PRND321 on it indicates to the vehicle operator the gear in which the transmission is placed. The shift position indicator may be lighted or not lighted.

In the known art, U.S. Pat. No. 5,626,093 to Jacobs et al shows a shift lever indicator. This patent shows a light bulb housing 42, depicted in FIGS. 3 and 4. The light bulb housing 42 has a square cross-section from the side view where the bottom is more narrow than the top, with the bottom and top connected by upwardly sloped sides (as shown in FIG. 4). The bottom of the Jacobs et al light box does not appear to be parabolically shaped. Moreover, the Jacobs et al concept does not contemplate the unique bulb positioning concept of the present invention.

U.S. Pat. No. 5,540,180 to Kataumi et al shows a bulb case 10 that is described as an elongated box with a smooth bottom (see FIGS. 2 and 5).

In addition, a light box for a shifter was used with a Honda Prelude in the past. However, the positioning and orientation of the light bulb was different than herein contemplated.

Other art germane to the state of the art includes:

| U.S. Pat. No. | Title | Inventor(s) | Issue Date |
| --- | --- | --- | --- |
| 4,565,151 | Apparatus For Indicating A Range Position For An Automatic Transmission Installed In A Vehicle | Buma | 1/21/86 |
| 5,245,313 | Automatic Transmission Lever Position Indicating Device | Polityka | 9/14/93 |
| 5,289,794 | Magnetically Aligned Transmission Shift Indicator | Jerro et al | 3/1/94 |
| 5,398,018 | Automatic Transmission Lever Position Indicating Device | Polityka | 3/14/95 |
| 5,420,565 | Electronic PRNODDL Display System | Holbrook | 5/30/95 |
| 5,861,800 | Ignition Interlock And PRNDL Indicator Powering Switch | Peters et al | 1/19/99 |

Little or no attention has been given to the position of the light bulb in the light box that illuminates the shift position indicator on the motor vehicle shifter. Also ignored was the shape of the light box itself. Problems with uneven back illumination of the shifter position indicator are typically corrected by including lenses within the light box to better distribute light. Another method of correcting the problem has been to use paints of varying opacity to paint the letters or number of the shift position indicator to give the impression of even distribution of light from the light bulb.

The present invention contemplates a new and improved light box for illuminating a shift position indicator of a motor vehicle shifter. The invention is simple in design, effective in use, and overcomes many difficulties while providing better and more advantageous overall results.

GENERAL SUMMARY OF THE INVENTION

The present invention contemplates a new and improved light box for illuminating a shift position indicator of a motor vehicle shifter.

According to one aspect of the present invention, a shifter assembly for use in a motor vehicle includes a shifter operatively connected to a transmission of the motor vehicle to shift the transmission between a plurality of operating positions. The shifter assembly also includes a shift position indicator located adjacent to the shifter to indicate one of the operating positions, a light box located beneath the shift position indicator having a parabolic base and side walls, and a light bulb inset in the light box for illuminating the shift position indicator.

According to another aspect of the present invention, a shifter assembly for use in a motor vehicle includes a shifter operatively connected to a transmission of the motor vehicle to shift the transmission between a plurality of operating positions. The shifter assembly also includes a shift position indicator located adjacent to the shifter to indicate one of the operating positions, a light box located beneath the shift position indicator having a base and side walls, and a light bulb for illuminating the shift position indicator. The light bulb casts a first shadow around a circumference of a base of the light bulb and a second shadow from a tip of the light bulb. The light bulb emits light radially from a body of the light bulb. The light bulb is inset in the light box at an angle $\alpha$ from the base between 0 degrees and 45 degrees. The light bulb is oriented to emit light on the shift position indicator.

According to another aspect of the present invention, a method of assembly of a shifter assembly for use with a transmission of a motor vehicle includes the steps of inserting the light bulb into a hole in the light box for receiving the light bulb at an angle $\alpha$ between 0 degrees and 45 degrees and rotating the light bulb an angle $\theta$ of approximately 45 degrees to secure the light bulb in light box. The light bulb is oriented so as to fully illuminate the shift position indicator.

In an overall combination and apparatus sense, another aspect of the invention entails a vehicle gear shift console comprising:

a gear shift position indicator extending generally longitudinally of the gear console and having
a shift position indicia array extending longitudinally of the console;
an illumination housing positioned to provide illumination of the indicia array;
a light bulb carried by the illumination housing;
a light bulb mount connected with the illumination housing and supporting the light bulb for illumination of the indicia array;
said light bulb, when illuminated, creating
shadowing projecting externally of said light bulb;
the light bulb mount including
support structure to position the aforesaid shadowing displaced from impingement upon the indicia array; and
the illumination housing having a parabolic light distributing surface having
a flat-configuration extending generally transversely of the indicia array, and a parabolic curved configuration extending generally longitudinally of the indicia array and operable to distribute light eminated from the light bulb, substantially longitudinally along the indicia array, substantially free of the aforesaid shadowing.

Furthermore, in an overall combination and method sense this invention presents a method for illuminating a vehicle gear shift console comprising:

providing a gear shift position indicator extending generally longitudinally of the gear console and having a shift position indicia array extending longitudinally of the console;

providing an illumination housing positioned to provide illumination of the indicia array;

providing a light bulb carried by the illumination housing, with
a light bulb mount being connected with the illumination housing and supporting the light bulb for illumination f the indicia array;

the light bulb, when illuminated, creating
shadowing projecting externally of said light bulb;

the light bulb mount providing
a support structure operable to position the aforesaid shadowing displaced from impingement upon the indicia array; and the illumination housing providing a parabolic light distributing surface having
a flat-configuration extending generally transversely of the indicia array, and
a parabolically curved configuration extending generally longitudinally of the indicia array and operable to distribute light eminating from the light bulb, substantially longitudinally along the indicia array, substantially free of the aforesaid shadowing.

Independent significance is attached to refinements of each of the aforesaid overall combination apparatus and method concepts wherein:

the shadowing includes
a first shadowed area projecting generally circumferentially around the lateral periphery of the light bulb,
a second shadowed area extending generally longitudinally away from the top of the light bulb, and
a third shadowed area projecting generally downwardly from the side of the light bulb; and the support structure includes
a first support operable to position the first and second shadowed areas on opposite sides, and displaced from, the indicia array of the gear shift position indicator, and
a second support operable to displace the third shadowed area from impingement upon the indicia array.

One advantage of the present invention is that the parabolic shape of the light box helps to evenly distribute light to the shift position indicator, thereby evenly illuminating the shift position indicator.

Another advantage of the present invention is that the parabolic shape of the light box eliminates the need of adding a lens to the light box to reflect light and disperse shadows, thereby reducing the cost to production of the shifter assembly.

Another advantage of the present invention is that the parabolic shape of the light box eliminates the need to use paints of differing opacity on the shift position indicator to produce the effect of even light distribution, thereby reducing the cost of production of the shifter assembly.

Another advantage of the present invention is that the orientation of the light bulb in the light box allows for the continued use of currently used light bulbs to produce even distribution of light.

Another advantage of the present invention is that a reduced number of parts in the shifter assembly reduces the cost to produce.

Another advantage of the present invention is that the light bulb may easily be inserted into the light box, thereby reducing the cost of assembly of the shifter assembly.

Still other benefits and advantages of the invention will become apparent to those skilled in the art to which it pertains upon reading and understanding the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings that form a part of this document.

DESCRIPTION OF THE PRESENTLY PREFERRED EMBODIMENTS

At the outset, it is to be appreciated that the present, vehicle shifter light box invention desirably may be incorporated and utilized with a console/escutcheon assembly as featured in pending U.S. patent application Ser. No. 09/504,278, entitled "Vehicle Component Escutcheon", filed Feb. 15, 2000 and designating Lee N. Bowers and Shinichi Yone as co-inventors. The disclosure of this pending application is herein incorporated by reference.

Figure 1:
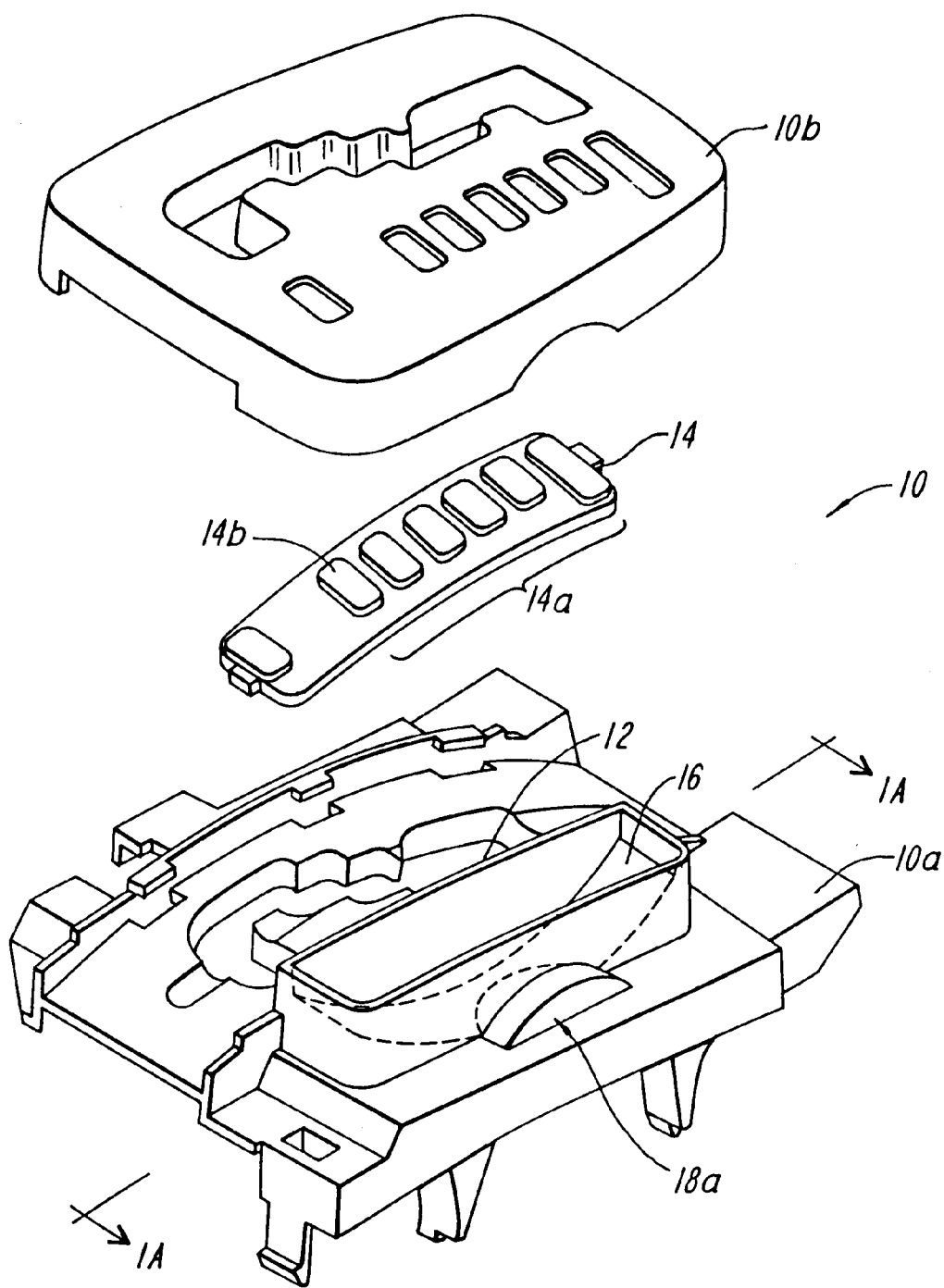
FIG. 1 in an exploded format, shows a shifter assembly 10 for use with a motor vehicle.

Referring now to the present invention and the appended drawings, which illustrate a preferred embodiment of the invention only and do not limit the invention, FIG. 1 shows a shifter assembly 10 for use with a motor vehicle. The shifter assembly 10 includes a shifter (not shown) projecting through shifter opening 12 that is operatively connected to the transmission of the motor vehicle to shift the transmission between a plurality of operating positions, such as P (park), R (reverse), N (neutral), D (drive), and other operating gears (1, 2, etc . . . ).

As will be evident to those practicing in this art, the base 10*a* and cover 10*b* of shifter assembly 10 will preferably be molded of suitable plastic material of the type well known and commonly employed in this art. Such materials provide adequate structural rigidity and strength while also providing appropriate resilience to facilitate installation and assembly with components.

A shift position indicator 14 is located adjacent to the shifter opening 12 to indicate to the operator of the motor vehicle which of the transmission operating positions is engaged. A light box 16 is located beneath this shift position indicator 14. A light bulb 18 for illuminating the shift position indicator 14 is preferably inset in the light box 16.

Figure 1A:
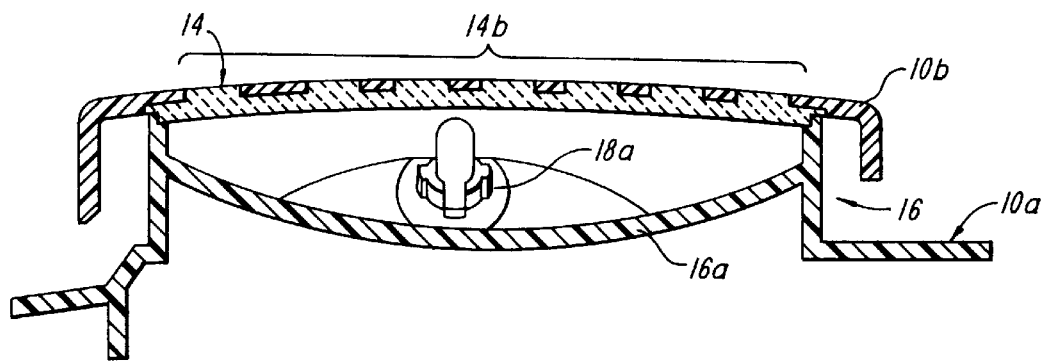
FIG. 1*a* provides a fragmentary, sectional view through the assembled escutcheon components of FIG. 1, as viewed generally along section line A—A of FIG. 1.

As is shown in FIGS. 1 and 1a, the assembly 10 includes a base 10a, a mating cover 10b, the light box 16, and indicia indicator 14 secured to the top of light box 16, thereby providing the assembled configuration depicted in FIG. 1a. Indicator 14 provides an at least partially translucent or transparent display or array 14a of shift positions including individual position indicating indicia 14b, arranged in an indicia array extending longitudinally over a longitudinally parabolic, transversely flat, light box base 16a.

Figure 6:
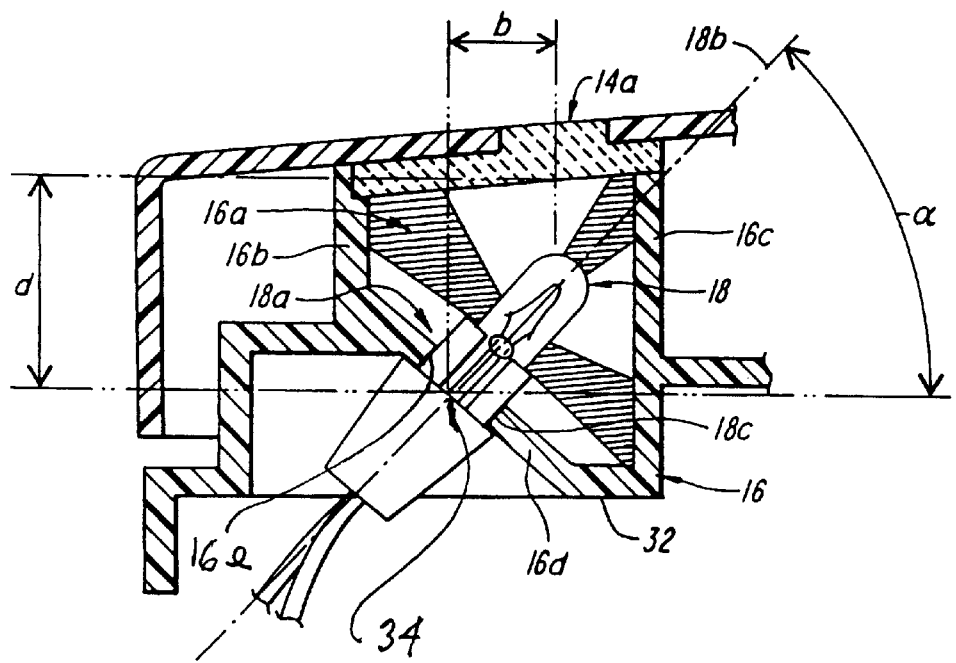
FIG. 6 shows a light box with inset light bulb according to the present invention.

As is shown in FIG. 6, the flat transverse configuration 32 of longitudinally parabolic light box base 16a extends transversely between, and connects generally upright light box side walls 16b and 16c.

One such side wall 16b defines a mounting area 18a for light bulb 18 having a longitudinal axis 18b and of the type with which this invention is concerned. Mounting area 18a may conventionally comprise a bayonet type light bulb socket 18c. As will be understood by those skilled in this art, the orientation of bayonet socket 18c, as determined by light box wall means 16d, will define a first light bulb support operable to position the light bulb axis in accordance with this invention, at the significant depth d within light box 16 with light bulb axis 18b inclined at an angle a relative to flat transverse wall shape 32 of longitudinally parabolic light box base 16a. This light bulb mounting depth and orientation serves to displace shadowed patterns emanating from the tip of bulb 18 and circumferentially around the base of the bulb 18 from impinging upon array 14a.

Additionally, the rotational securing manipulations and constraints involved in mating bulb 18 to bayonet socket 18c enable socket 18c serve to define a second bulb support 16e operable, due to the rotational manipulation of bulb 18 about axis 18b required to secure bulb 18 to socket 18c, to displace a shadowed pattern emanating from the side of bulb 18 away from indicia array 14a and against the base 16a of light box 16.

Figure 2:
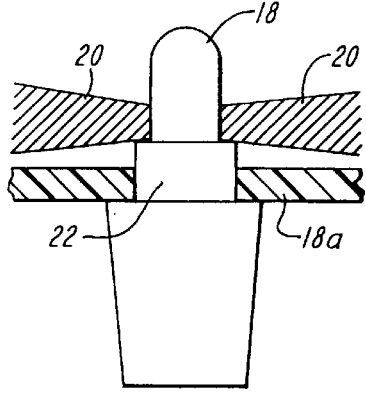
FIG. 2 shows a light bulb casting a shadow radially from the base of the light bulb.
Figure 3:
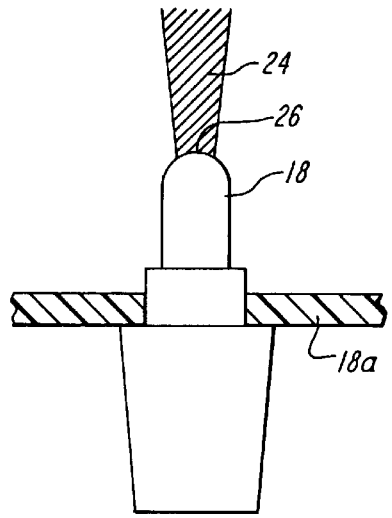
FIG. 3 shows a light bulb casting a shadow axially from the tip of the light bulb.
Figure 4A:
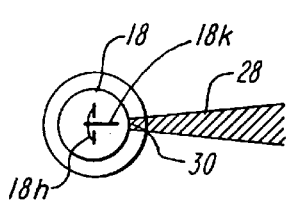
FIGS. 4*a* and 4*b* provide, respectively, top and side elevational views of a light bulb casting a shadow to the side of the light bulb.
Figure 4B:
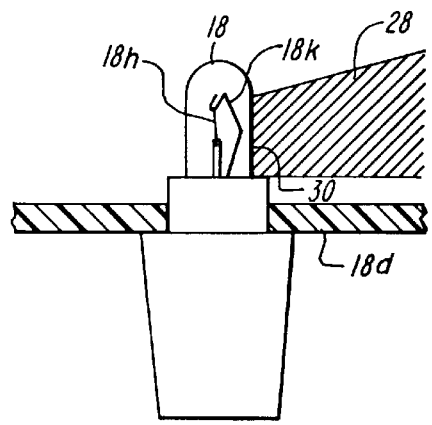

FIGS. 2–4 and 8 show different views of a light bulb 18 typically used in shifter assembly 10 (see FIG. 1). The typical light bulb 18 used casts three shadows 20, 24, 28. The first shadow 20 is cast radially outward from the base 22 of the light bulb 18 as shown in FIG. 2. The second shadow 24 is cast axially from the tip 26 of the light bulb 18 as shown in FIG. 3. A third, lesser shadow 28 is cast along a part of a side 30 of the light bulb 18 as shown in FIGS. 4a and 4b.

As will be here appreciated the terms "shadow", "shadowed", etc. refer generally to a visually discernible diminishment of intensity of illumination issuing from the bulb 20. Such diminishments may result from filament presence or placement, bulb shape, variations in bulb wall thickness, positioning or orientation of bulb wall (usually glass) portions, etc.

Figure 5:
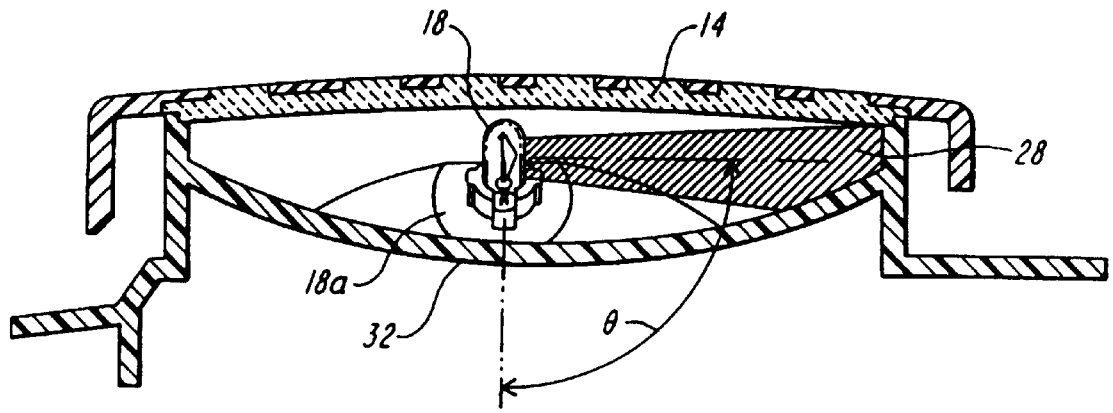
FIG. 5 shows a side elevation, cross-sectional view of the light box of this invention.

FIG. 5 shows a side elevation, cross-sectional view of the light box 16 according to the present invention, i.e., a longitudinal view. The third shadow 28 can be corrected by orientation of the light bulb 18 in the light box 16 as shown in FIG. 5. The angle of rotation θ of the light bulb 18 during assembly is such that rotation of the light bulb 18 through angle θ results in the third shadow 28 being angled downward toward the base 32 of the light box 16 as opposed to the shift position indicator 14.

Figure 7:
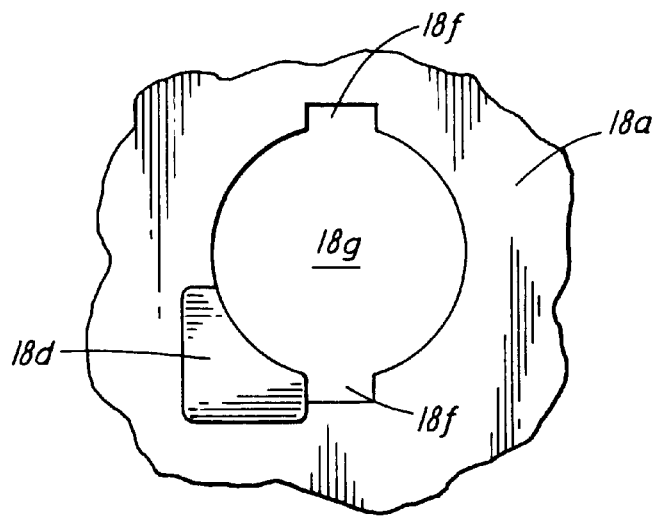
FIG. 7 schematically depicts a representative arrangement for mounting the light in the light box of this invention so as to insure the degree of bulb rotation during bulb installation that will insure that a shadowed area is displaced from a shifter indicia indicating array.
Figure 8:
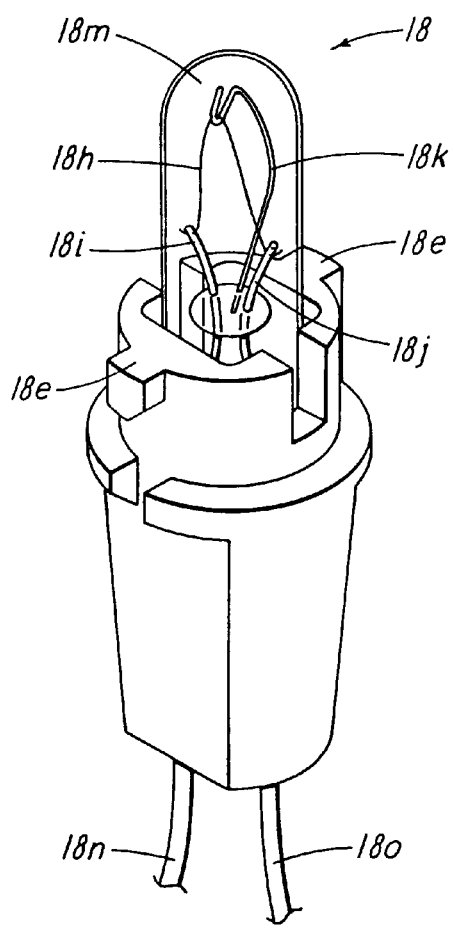
FIG. 8 provides an illustration of one light bulb employed herein with its various shadowed regions.

As is shown in FIG. 7, this control over the installation rotation angle θ may be achieved by a stop lug 18d which is engaged by one of mounting lugs 18e carried by the base of bulb 18. As will be understood, the lugs 18e of FIG. 8 are inserted through notches 18f extending radially outwardly of bulb base opening 18g of mount 18c. The bulb 18 may then be rotated through angle θ until a bulb lug 18e engages top lug 18d and the bulb is secured by a bayonet/friction fit of socket 18c.

Bulb 18, as shown in FIG. 8, includes a filament 18h supported by filament posts 18i and 18j. A medium filament support 18k extends from the base of the interior of the bulb to supportingly engage a mid portion of filament 18h. In this connection, it is to be appreciated that lateral shadowing 28 may be caused by the intervening presence of median support 18k.

The bulb and its bayonet mounting are conventional, and well understood in the art. By inserting the bulb end 18m through opening 18g, with bulb lugs 18e passing through mount notches 18f, the bulb may be rotated through angle θ until one of lugs 18e engages stop 18d such that bulb 18 is functionally secured to mount 18a at the desired angular position. The electrical supply wires 18n and 18o may then be connected to a vehicle power source.

FIG. 6 shows a transverse, sectional view of light box 16 with inset light bulb 18 according to the present invention. The light bulb 18 is inset with its longitudinal axis 18b at an angle α with respect to flat, transverse shape of the base 32 of the light box 16. Angle α is preferably between 0 degrees and 45 degrees. In a preferred embodiment of the invention, the angle α is 22 degrees.

With continuing reference to FIG. 6, the light bulb 18 is preferably offset in the light box 16 a horizontal distance b from the center of the array 14a of the shift position indicator 14. In a preferred embodiment of the invention, this horizontal distance b is 11.0 mm. The light bulb 16 is also offset a vertical depth d from the bottom of the shift position indicator 14 to the center 34 of the base 22 of the light bulb 18. In a preferred embodiment of the invention, the preferred depth is 18.0 mm. The horizontal offset b, vertical depth 3, and orientation angle α of the light bulb 18 ensure that the light bulb 18 emits light on the entire shift position indicator 14, and the shadows 2, 24, 28 are not cast on the shift position indicator array 14a.

With reference to FIG. 5, the base 16a of the light box 16 preferably has a longitudinally extending parabolic shape. The parabolic, longitudinal shape of base 16a ensures that the light emitted from the light bulb 18 is spread evenly of the entire length of the shift position indicator 14. The parabolic shape of the base 16a of the light box 16 preferably accomplishes this even transmission of light to the shift position indicator without the need of a lens or the varying of opaqueness of the paint on the shift position indicator 14.
Summary of Presently Preferred Embodiments and Overall Scope of Invention In an overall sense, the combination embodied in the hereinbefore described apparatus resides in a vehicle gear shift console 10 comprising:

a gear shift position indicator 14 extending generally longitudinally of gear console 10 and having a shift position indicia array 14a extending longitudinally of the console 10;

an illumination housing 16 positioned to provide illumination of the indicia array 14a;

a light bulb 18 carried by the illumination housing 16;

a light bulb mount 18a connected with the illumination housing and supporting the light bulb 18 for illumination of the indicia array 14a;

the light bulb 18, when illuminated, creating a first shadowed area 20 projecting generally circumferentially around the lateral periphery 22 of the light bulb 18, a second shadowed area 24 extending generally longitudinally away from the top 26 of the light bulb 18, and a third shadowed area 28 projecting generally outwardly from the light bulb side 30;

the light bulb mount 18a including a first support 16d operable to position the first 20 and second 24 shadowed areas on opposite sides, and displaced from, the indicia array 14a of the gear shift position indicator 14, and a second support 16e operable to displace the third shadowed area 28 from impingement upon the indicia array 14a; and p1 the illumination housing 16 having a parabolic light distributing surface having a flat-configuration 32 extending generally transversely of the indicia array, and a parabolically curved configuration 16a extending generally longitudinally of the indicia array 14a and operable to distribute light eminating from the light bulb 18, substantially longitudinally along the indicia array 14a, substantially free of the first 20, second 24, and third 28 shadowed areas.

In a method sense, the combination of concepts herein involved produce a method for illuminating a vehicle gear shift console 10 comprising:

providing a gear shift position 14 indicator extending generally longitudinally of the gear console 10 and having a shift position indicia array 14a extending longitudinally of the console 10;

providing an illumination housing 16 positioned to provide illumination of the indicia array 14a;

providing a light bulb 18 carried by the illumination housing 16e, with a light bulb mount 18a being connected with the illumination housing and supporting the light bulb 18 for illumination of the indicia array 14a;

the light bulb 18, when illuminated, creating a first shadowed area 20 projecting generally circumferentially around the lateral periphery 22 of the light bulb 18, a second shadowed area 24 extending generally longitudinally away from the top 26 of the light bulb 18, and a third shadowed area 28 projecting generally outwardly from the light bulb side 30;

the light bulb mount 18a providing a first support 16a operable to position the first 20 and second 24 shadowed areas on opposite sides, and displaced from the indicia array 14a of the gear shift position indicator 14, and a second support 16e operable to displace the third shadowed area 28 from impingement upon the indicia array 14a; and the illumination housing providing a parabolic light distributing surface having a flat-configuration 32 extending generally transversely of the indicia array 14a, and a parabolically curved configuration 16a extending generally longitudinally of the indicia array 14a and operable to distribute light eminating from the light bulb 18, substantially longitudinally along the indicia array 14a, substantially free of the first 20, second 24, and third 28 shadowed areas.

As to each of these combination concepts, presented in the context of a light bulb generating the three shadowed areas above described, it is to be appreciated that the invention also broadly contemplates the displacement of light bulb generated shadowing, in any form, from impingement upon the indicia array 14a.

Summary of Advantages and Scope of Invention

The console light box concept herein presented eliminates the need for light distributing lenses or special painting in order to avoid "shadowing" problems.

Thus, without reliance upon special lenses or painting, and with a light box which is integral with the console base, even illumination of the shifter indicia array is achieved through this invention. In so doing, console fabrication costs are reduced and manufacturing is simplified. The preferred embodiments have been described above. Those skilled in the art will note that the methods and apparatuses described above may incorporate changes and modifications without departing from the general scope of this invention. The invention is intended to include all such modifications, alterations, additions, deletions, and equivalent elements and/or assemblies insofar as they come within the scope of the appended claims.

Having described the invention, it is now claimed:

1. A vehicle gear shift console comprising:

a gear shift position indicator extending generally longitudinally of said gear console and having a shift position indicia array extending longitudinally of said console;

an illumination housing positioned to provide illumination of said indicia array;

a light bulb carried by said illumination housing;

a light bulb mount connected with said illumination housing and supporting said light bulb for illumination of said indicia array;

said light bulb, when illuminated, creating shadowing projecting externally from said light bulb;

said light bulb mount including a support structure operable to position said shadowing displaced from impingement upon said indicia array; and said illumination housing having a parabolic light distributing surface having a flat-configuration extending generally transversely of said indicia array, and a parabolically curved configuration extending generally longitudinally of said indicia array and operable to distribute light emanating from said light bulb, substantially longitudinally along said indicia array, substantially free of said shadowing;

said parabolic light distributing surface and said support structure of said light bulb mount cooperating to produce even illumination of said shift position indicia array along the length thereof, illumination of said shift position indicia array along the length thereof, substantially free of said shadowing cast by and emanating from said light bulb, and displacement of said shadowing, cast by and emanating from said light bulb, from impingement upon said shift position indicia array.

2. A vehicle gear shift console as described in claim 1 wherein:

said shadowing includes
 a first shadowed area projecting generally circumferentially around the lateral periphery of said light bulb,
 a second shadowed area extending generally longitudinally away from the top of said light bulb, and
 a third shadowed area projecting generally outwardly from the side of said light bulb;

said support structure includes
 a first support operable to position said first and second shadowed areas on opposite sides, and displaced from, said indicia array of said gear shift position indicator, and
 a second support operable to displace said third shadowed area from impingement upon said indicia array; and said parabolic light distributing surface is operable to distribute light emanating from said light bulb, substantially longitudinally along said indicia array, substantially free of said first, second, and third shadowed areas.

3. A method for illuminating a vehicle gear shift console comprising:

providing a gear shift position indicator extending generally longitudinally of said gear shift console and having
 a shift position indicia array extending longitudinally of said console;

providing an illumination housing positioned to provide illumination of said indicia array;

providing a light bulb carried by said illumination housing, with
 a light bulb mount being connected with said illumination housing and supporting said light bulb for illumination of said indicia array;

said light bulb, when illuminated, creating
 shadowing projecting externally from said light bulb;

said light bulb mount providing
 a support structure operable to position said shadowing displaced from impingement upon said indicia array; and said illumination housing providing a parabolic light distributing surface having
 a flat-configuration extending generally transversely of said indicia array and
 a parabolically curved configuration extending generally longitudinally of said indicia array and operable to distribute light emanating from said light bulb, substantially longitudinally along said indicia array, substantially free of said shadowing;

said parabolic light distributing surface and said support structure of said light bulb mount cooperating to produce
 even illumination of said shift position indicia array along the length thereof,
 illumination of said shift position indicia along the length thereof, substantially free of said shadowing cast by and emanating from said light bulb, and
 displacement of said shadowing, cast by and emanating from said light bulb, from impingement upon said shift position indicia array.

4. A method for illuminating a vehicle gear shift console as described in claim 3 wherein:

said shadowing includes
 a first shadowed area projecting generally circumferentially around the lateral periphery of said light bulb,
 a second shadowed area extending generally longitudinally away from the top of said light bulb, and
 a third shadowed area projecting generally outwardly from the side of said light bulb;

said support structure provides
 a first support operable to position said first and second shadowed areas on opposite sides, and displaced from, said indicia array of said gear shift position indicator, and
 a second support operable to displace said third shadowed area from impingement upon said indicia array; and said parabolic light distributing surface is operable to distribute light emanating from said light bulb, substantially longitudinally along said indicia array, substantially free of said first, second, and third shadowed areas.

* * * * *